(12) United States Patent
Kato et al.

(10) Patent No.: US 9,768,600 B1
(45) Date of Patent: Sep. 19, 2017

(54) BRANCH BOX

(71) Applicant: Yazaki Corporation, Tokyo (JP)

(72) Inventors: Hajime Kato, Kakegawa (JP);
Haruhiko Yokoyama, Kakegawa (JP);
Yuuichirou Motohashi, Kakegawa (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 15/461,659

(22) Filed: Mar. 17, 2017

(30) Foreign Application Priority Data

Mar. 18, 2016 (JP) ................................ 2016-056169

(51) Int. Cl.
| | |
|---|---|
| *H02G 3/04* | (2006.01) |
| *H02G 3/08* | (2006.01) |
| *H01R 4/34* | (2006.01) |
| *H02B 1/48* | (2006.01) |
| *H02B 1/04* | (2006.01) |

(52) U.S. Cl.
CPC ............... *H02G 3/088* (2013.01); *H01R 4/34* (2013.01); *H02B 1/04* (2013.01); *H02B 1/48* (2013.01); *H02G 3/083* (2013.01)

(58) Field of Classification Search
CPC .......... H02G 3/088; H02G 3/083; H01R 4/34; H02B 1/48; H02B 1/04
USPC ...................................................... 174/72 A
See application file for complete search history.

(56) References Cited

U.S. PATENT DOCUMENTS

| | | | | | |
|---|---|---|---|---|---|
| 4,669,793 | A | * | 6/1987 | Hayashi ................. | H01R 13/74 439/338 |
| 5,816,850 | A | * | 10/1998 | Yamada ................. | H01H 9/085 439/507 |
| 5,859,580 | A | * | 1/1999 | Hashizawa ............ | H01R 13/68 337/255 |
| 6,030,257 | A | * | 2/2000 | Furuya ................ | H01H 85/2045 439/620.26 |
| 6,396,380 | B1 | * | 5/2002 | Girke ................... | H01H 85/044 337/188 |
| 2002/0101041 | A1 | * | 8/2002 | Kameyama .......... | H01R 13/521 277/628 |

FOREIGN PATENT DOCUMENTS

JP          2000-114752 A      4/2000

* cited by examiner

*Primary Examiner* — Sherman Ng
(74) *Attorney, Agent, or Firm* — Sughrue Mion, PLLC (57) ABSTRACT

A branch box (100) includes: a branch portion (21) branching a power path (205A) into at least two branch paths (206A, 207A); a fuse (60) located on at least one of the branch paths; a conductive member (33) connecting the branch portion and the branch path having the fuse; a first housing portion (11) receiving the fuse and closing its opening with a lid portion (81) to define a housing space; and a second housing portion (12) receiving the branch portion. The first housing portion is sealed with a first sealing material (85) filling a gap between the lid portion and the opening and is out of contact with the fuse. The second housing portion is sealed with a second sealing material (86) independent from the first sealing material. The conductive member passes through a partition wall (25) separating the first housing portion and the second housing portion.

4 Claims, 7 Drawing Sheets

BRANCH BOX

CROSS-REFERENCES TO RELATED APPLICATION(S)

This application is based on and claims priority from Japanese Patent Application No. 2016-056169 filed on Mar. 18, 2016, and the entire contents of which are incorporated herein by reference.

BACKGROUND

Field of the Invention

The present invention relates to branch boxes, and more particularly, a branch box that branches electric power supplied from a power source to a plurality of objects to be supplied with electric power.

Description of Related Art

From the viewpoint of waterproofing and insulating electric circuit components, a method has been used to house an electric circuit component in a housing box and then to seal inside of the housing box with resin to surround the electric circuit component. For example, one of such box unit in the background art (hereinafter referred to as "background-art box") is configured to house an electric circuit component (e.g., diode) and its peripheral parts (e.g., terminals) are housed in a housing box and then to collectively seal the electric circuit component and the peripheral parts with resin by using a potting method.

As for details of the above connection structure, refer to JP 2000-114752 A.

SUMMARY

When resin-sealing the electric circuit component (e.g., diode) as for the background-art box, the resin is solidified in a state of being in close contact with the electric circuit component, and thus it is typically difficult to separate only the electric circuit component from the background-art box (in particular, to remove the resin from the inside of the housing box and take out only the diode). In other words, the background-art box is not designed to replace the electric component.

As a similar example, a fuse as an electric circuit component is incorporated into a branch box that branches electric power supplied from a power source to a plurality of objects to be supplied with electric power. When using such fuse as an electric circuit component and resin-sealing it as in the background-art box, it is difficult to remove the resin and take out only the fuse. This causes replacement of the entire branch box when only replacing the fuse. The replacement of the entire branch box is undesirable from the viewpoint of its cost, and is also undesirable from the viewpoint of its workability due to re-wiring to the replaced new branch box after the replacement. In particular, when resin-sealing a plurality of objects including a fuse in a branch box, the replacement of the entire branch box to replace only the fuse causes replacements of the objects other than the fuse, even if the other objects do not need to be replaced. This causes further disadvantages in cost and in workability. As described above, if the sealing method of the background-art box is applied to a housing box incorporating a fuse, the replacement of the fuse is difficult from the above various viewpoints.

Further, when resin-sealing a plurality of objects to be sealed in a branch box as described above, it is desirable for the fuse replacement work to reduce or eliminate negative effects in the sealed state of the objects other than the fuse (such as insulation property and waterproof property) as much as possible.

An object of the present invention is, regarding a branch box including a plurality of sealed objects such as a fuse with resin, to provide a branch box capable of achieving both of easy fuse replacement and resin-sealed state retainment.

Embodiments of the present invention provide the following items (1) to (4).

(1)

A branch box branching electric power supplied from a power source to a plurality of objects to be supplied with the electric power, the branch box comprising:

a branch portion branching a power path connecting to the power source into at least two branch paths;

a fuse located on at least one of the branch paths;

a conductive member connecting the branch portion and the branch path having the fuse;

a first housing portion receiving the fuse, the first housing portion having a box shape with an opening on one surface, the opening being closed by a lid portion to define a space for housing the fuse inside the first housing portion; and a second housing portion receiving the branch portion, the first housing portion being sealed with a first sealing material filling a gap between the lid portion and the opening and being out of contact with the fuse, the second housing portion being sealed with a second sealing material independent from the first sealing material, and the conductive member passing through a partition wall separating the first housing portion and the second housing portion.

(2)

The branch box according to item (1), wherein the first sealing material is made from a material to allow unsealing of the first sealing material easier than unsealing of the second sealing material.

(3)

The branch box according to item (1) or item (2), wherein the second sealing material is in contact with the branch portion.

(4)

The branch box according to any of item (1) to item (3), wherein the conductive member is press-fitted in an insertion hole through the partition wall.

According to first aspect of the invention, relating to the item (1), the fuse is stored in the space defined inside the first housing portion (specifically, in the space formed by closing the opening of the first housing portion by the lid portion and the first sealing material). The sealing material (the first sealing material) is out of contact with the fuse. For this reason, at the time of fuse replacement, by separating (e.g., peeling off) the lid portion and the first sealing material from the opening of the first housing portion, the fuse can be easily replaced. Further, after the fuse replacement, by attaching the lid portion to the opening of the first housing portion again (e.g., by attaching the lid portion to the opening again by use of the first sealing material after peeling off the first sealing material adhering to the lid portion), the fuse can be easily sealed again. Hence, according to this aspect of the branch box, fuse replacement is easy compared with the background-art box.

Further, the first housing portion and the second housing portion are separated by the partition wall and separately sealed by independent sealing materials (the first sealing material and the second sealing material). For this reason, the work of fuse replacement (the work of separating the first sealing material from the first housing portion) does not affect the sealed state of the second housing portion. Hence, the sealed state by resin sealing can be more surely retained than when the first housing portion and the second housing portion are sealed by sealing materials that are continuous (not independent of each other). In addition, since the fuse in the first housing portion and the branch portion in the second housing portion are connected by the conductive member passing through the partition wall, the electric connection between the fuse and the branch portion is achieved even though the first sealing material and the second sealing material are independent of each other.

Hence, according to this aspect of the branch box, regarding a branch box including a plurality of sealed objects such as a fuse with resin, the branch box is capable of achieving both of easy fuse replacement and resin-sealed state retainment.

According to second aspect of the invention, relating to the item (2), when the first housing portion is unsealed (when the lid portion and the first sealing material are separated from the opening of the first housing portion), the unsealing is easier than when both the first housing portion and the second housing portion are sealed by the second sealing material (sealing material with which unsealing is more difficult). For this reason, fuse replacement is facilitated. Further, a strong sealing material not intended for unsealing can be adopted as the second sealing material. For this reason, the sealed state of the second housing portion (the branch portion) can be more surely held.

In addition, as the first sealing material with which unsealing is comparatively easy, for example, a soft one-component sealing material can be used. Moreover, as the second sealing material with which unsealing is comparatively difficult, for example, a hard two-component sealing material can be used.

According to third aspect of the invention, relating to the item (3), since the second sealing material is in contact with the branch portion, even when an external force and an impact reach the branch box, a position shift of the branch portion can be prevented. In other words, the branch portion is firmly held. For this reason, the sealed state of the second housing portion (the branch portion) can be more surely held than when the second sealing material is out of contact with the branch portion.

According to fourth aspect of the invention, relating to the item (4), since the conductive member (e.g., a bus bar) is press-fitted in the partition wall, no gap is substantially present between the conductive member and the partition wall. For this reason, when the first housing portion and the second housing portion are each sealed (by using a potting method), the leakage of the sealing material from one housing portion to the other housing portion can be more surely prevented than when the conductive member is simply inserted in a through hole formed on the partition wall. In addition, it is unnecessary to provide a gasket for preventing such leakage. Hence, the manufacturing cost of the branch box can be reduced as well as achieving both of easy fuse replacement and resin-sealed state retainment.

As described above, according to the present invention, regarding a branch box including a plurality of sealed objects such as a fuse with resin, a branch box capable of achieving both of easy fuse replacement and resin-sealed state retainment is provided.

Several aspects of the invention have been described briefly above. The further details of the invention will be made clearer if the following description is read through with reference to the accompanying drawings.

BRIEF DESCRIPTION OF THE DRAWINGS

FIG. 2A and FIG. 2B are views for explaining the general structure of the branch box illustrated in FIG. 1, in particular.

FIG. 4A to FIG. 4C are cross-sectional views of the branch box illustrated in FIG. 3, in particular, FIG. 4A is an A-A cross-sectional view of the branch box.

DETAILED DESCRIPTION

A branch box according to an embodiment of the present invention will be described with reference to the drawings.

Embodiment

Figure 1:
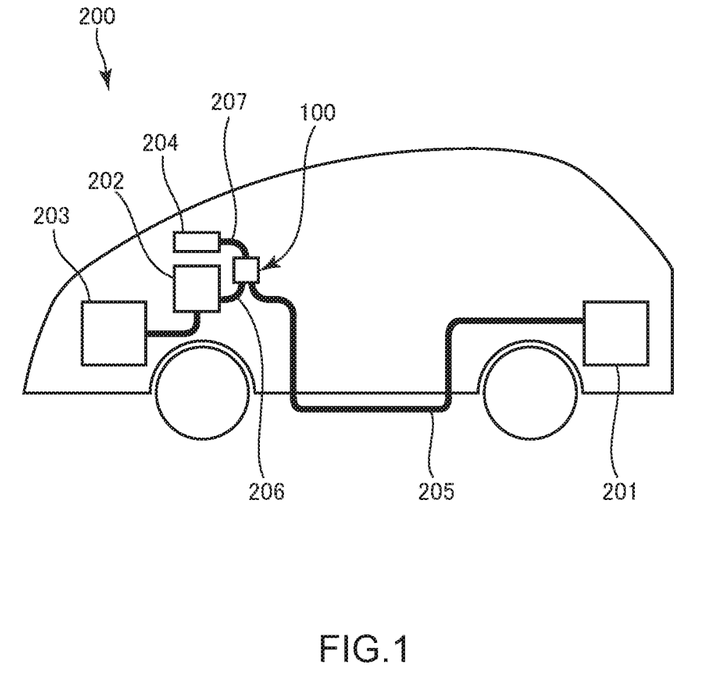
FIG. 1 is a schematic view illustrating an example where a branch box according to an embodiment of the present invention is applied to a vehicle.

FIG. 1 illustrates a embodiment where the branch box (hereinafter, also referred to as "branch box 100") according to the present invention is applied to a hybrid vehicle 200. Hereinafter, the hybrid vehicle 200 is also referred to simply as "vehicle 200".

As illustrated in FIG. 1, the vehicle 200 is provided with a battery 201 (power source) disposed in the rear of the vehicle body, an inverter 202 disposed in the front of the vehicle body, a motor generator (MG) 203 and an air conditioner unit 204. The branch box 100 is electrically connected to an electric wire 205 extending from the battery 201, and branches power supplied from the battery 201 to a plurality of objects to be supplied with power (the inverter 202 and the air conditioner unit 204). The branch box 100 and the inverter 202 are electrically connected through an electric wire 206, and the branch box 100 and the air conditioner unit 204 are electrically connected through an electric wire 207.

Figure 2A:
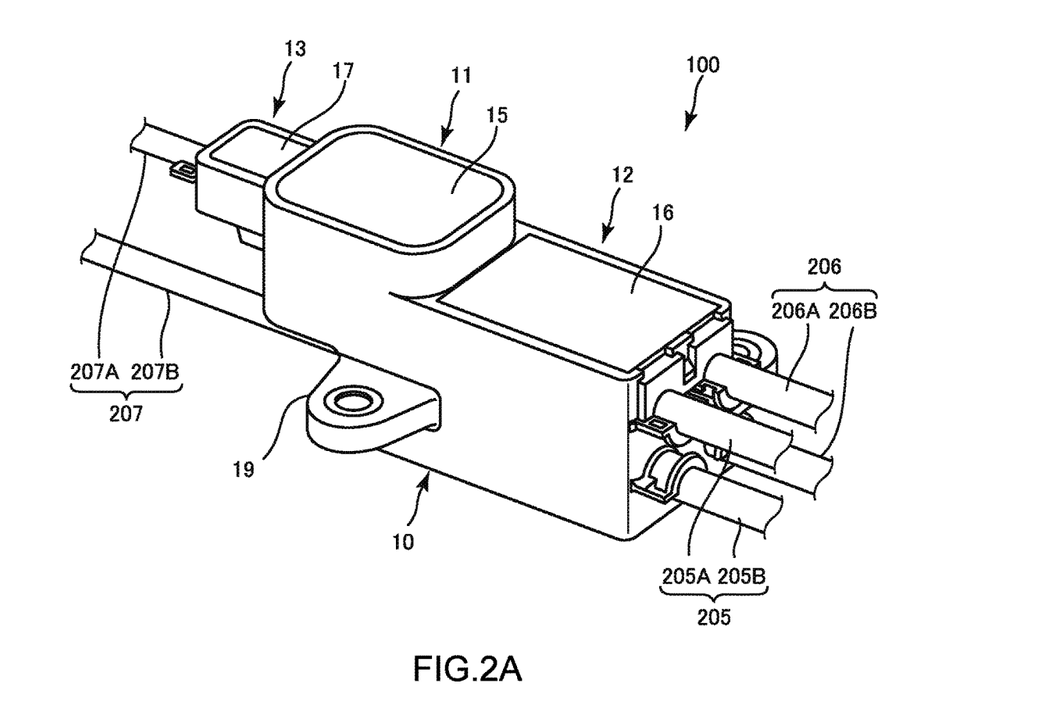
FIG. 2A is a perspective view of the branch box.
Figure 2B:
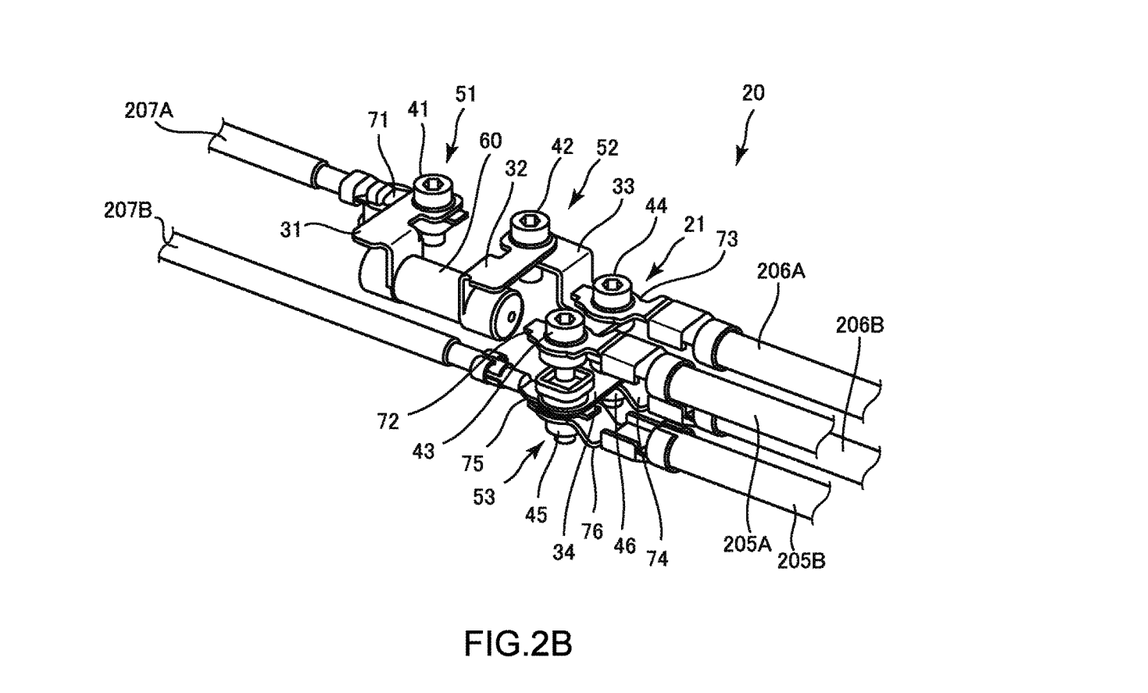
FIG. 2B is a perspective view where only a circuit structure housed in the branch box is extracted (for convenience of explanation).

As illustrated in FIG. 2, the branch box 100 has a branch box body 10 and a circuit structure 20 housed in the branch box body 10.

Figure 4A:
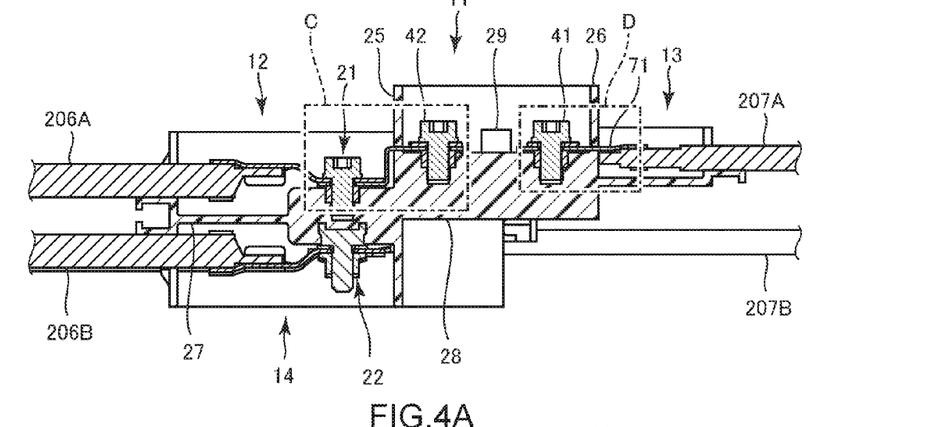

More specifically, as illustrated in FIG. 2A, the branch box body 10 has a first housing portion 11, a second housing portion 12, a third housing portion 13, and a fourth housing portion 14 that is not illustrated in this figure (see FIG. 4).

To the openings of the first housing portion 11, the second housing portion 12, the third housing portion 13 and the fourth housing portion 14, covers 15 to 18 are attached. The second housing portion 12 and the third housing portion 13 are disposed so as to sandwich the first housing portion 11, the electric wire 205 (205A, 205B) and the electric wire 206 (206A, 206B) are provided so as to pass through the end portion wall (the end portion on the near side in the figure) of the second housing portion 12, and the electric wire 207 (207A, 207B) is provided so as to pass through the end portion wall (the end portion on the far side in the figure) of the third housing portion 13. On a side surface of the branch box body 10, an attachment portion 19 for fixing the branch box 100 to the body of the vehicle 200 by using a bolt is provided. In addition, the electric wires 205 to 207 are connected to the circuit structure 20 housed in the branch box body 10 as described later.

As illustrated in FIG. 2B, the circuit structure 20 has a first circuit portion 51 including a bus bar 31, a second circuit portion 52 including a bus bar 32 and a bus bar 33, a third circuit portion 53 including a bus bar 34, and a fuse 60 provided between the first circuit portion 51 and the second circuit portion 52.

In the first circuit portion 51, the bus bar 31 replaceably holds the fuse 60, and is electrically connected to one electrode of the fuse 60. Further, the bus bar 31 is connected by using a hexagonal nut 41 to a plate terminal 71 attached to the terminal of the electric wire 207A for supplying power to the air conditioner unit 204.

In the second circuit portion 52, the bus bar 32 replaceably holds the fuse 60, and is electrically connected to the other electrode of the fuse 60. Further, the bus bar 32 is coupled to the adjoining bus bar 33 by using a hexagonal nut 42. To the bus bar 33, a plate terminal 72 attached to the terminal of the electric wire 205A for supplying power from the battery 201 and a plate terminal 73 attached to the terminal of the electric wire 206A for supplying power to the inverter 202 are connected by using hexagonal nuts 43 and 44.

Here, part of the bus bar 33 (more specifically, the part of the bus bar 33 where the plate terminals 72 and 73 are attached) forms a branch portion 21 that branches a power path (a path including the electric wire 205A) connecting with the power output terminal (positive terminal) of the battery 201 to at least two branch paths (a path including the electric wire 206A and a path including the electric wire 207A).

In the third circuit portion 53, to the bus bar 34, a plate terminal 74 attached to the terminal of the electric wire 206B for returning the power having passed through the inverter 202 to the battery 201, a plate terminal 75 attached to the terminal of the electric wire 207B for returning the power having passed through the air conditioner unit 204 to the battery 201 and a plate terminal 76 attached to the terminal of the electric wire 205B for gathering these powers to one path to return them to the battery 201 are connected by using hexagonal nuts 45 and 46.

In addition, part of the bus bar 34 (more specifically, the part of the bus bar 34 where the plate terminals 74 to 76 are attached) forms a branch portion 22 that branches a power path (a path including the electric wire 205B) connecting with the power input terminal (negative terminal) of the battery 201 to at least two branch paths (a path including the electric wire 206B and a path including the electric wire 207B).

Figure 3:
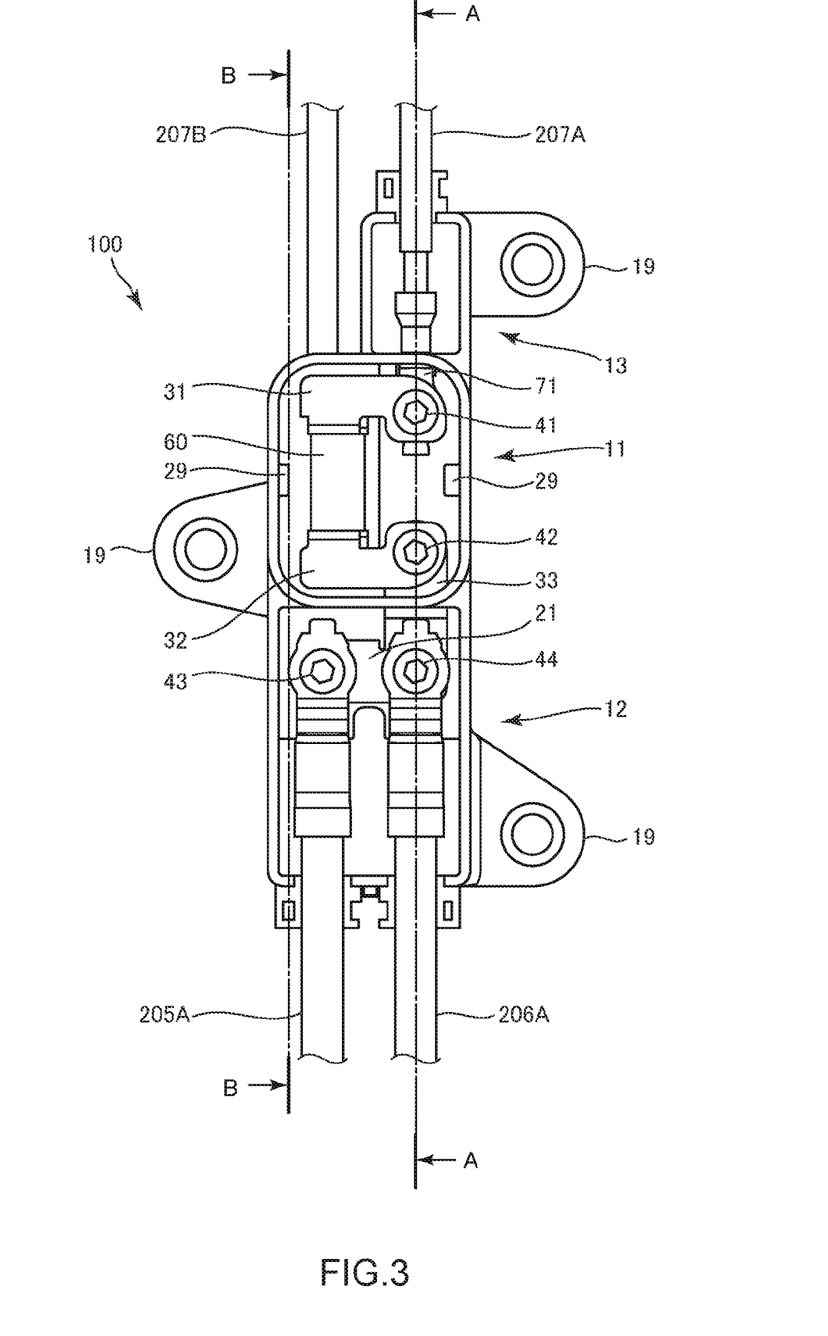
FIG. 3 is a top view of the branch box illustrated in FIG. 1. Here, illustration of sealing materials is omitted to illustrate inside of the branch box.

As illustrated in FIG. 3, the first housing portion 11, the second housing portion 12 and the third housing portion 13 are box-shaped. In the first housing portion 11, the fuse 60 is housed, and in the second housing portion 12, the branch portion 21 is housed. In the third housing portion 13, the end portion of the electric wire 207A including part of the plate terminal 71 is housed. The first housing portion 11 is provided with a rib 29 protruding from the inner wall surface. The rib 29 supports the cover 15 that closes the opening of the first housing portion 11 as described later. In addition, in FIG. 3, for convenience of explanation, illustration of the sealing material in each housing portion is omitted. The same applied to FIG. 4 and FIG. 5.

Figure 5:
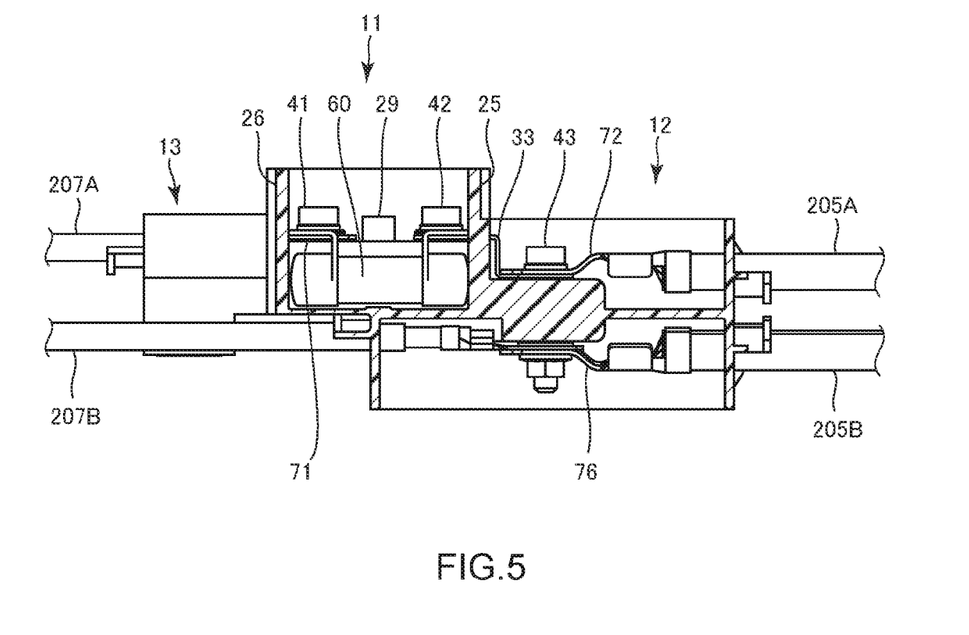
FIG. 5 is a B-B cross-sectional view of the branch box illustrated in FIG. 3. Here, illustration of sealing materials is omitted to illustrate inside of the branch box.

As illustrated in FIG. 4A and FIG. 5, the first housing portion 11 and the second housing portion 12 are disposed in such a manner as to offset in the direction orthogonal to the box-shaped open surface (the vertical direction in the figure). The first housing portion 11 and the second housing portion 12 are separated by a partition wall 25. Likewise, the first housing portion 11 and the third housing portion 13 are disposed in such a manner as to offset in the direction orthogonal to the box-shaped open surface (the vertical direction in the figure), and are separated by a partition wall 26. On the other hand, the second housing portion 12 and the fourth housing portion 14 are disposed in such a manner as to be open in different directions (the vertical direction in the figure), and are separated by a partition wall 27. In addition, the fourth housing portion 14 is box-shaped, and houses the branch portion 22.

Figure 4B:
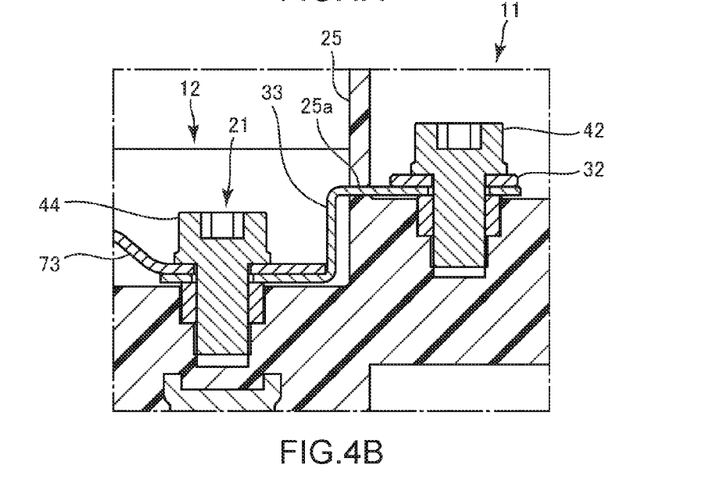
FIG. 4B is an enlarged view of C part of FIG. 4A.

As illustrated in FIG. 4B, through the partition wall 25 separating the first housing portion 11 and the second housing portion 12, a slit-like insertion hole 25a is formed. In the insertion hole 25a of the partition wall 25, the bus bar 33 extending from the branch portion 21 is press-fitted. After passing through the insertion hole 25a, the bus bar 33 is electrically connected to the bus bar 32 holding the fuse 60.

Figure 4C:
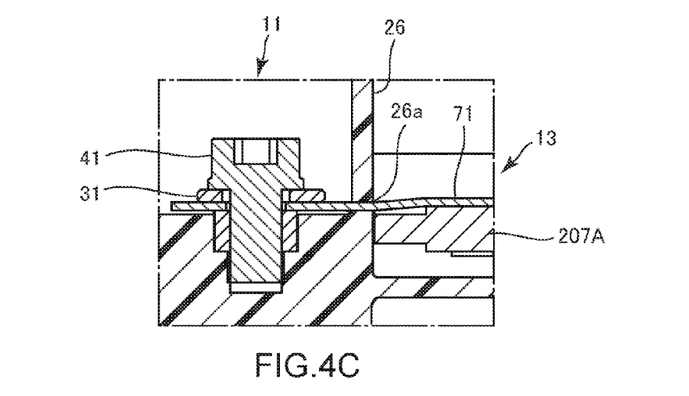
FIG. 4C is an enlarged view of D part of FIG. 4A. Here, illustration of sealing materials is omitted to illustrate inside of the branch box.

As illustrated in FIG. 4C, through the partition wall 26 separating the first housing portion 11 and the third housing portion 13, a slit-like insertion hole 26a is formed. In the insertion hole 26a of the partition wall 26, the plate terminal 71 extending from the electric wire 207A is press-fitted. After passing through the insertion hole 26a, the plate terminal 71 is electrically connected to the bus bar 31 holding the fuse 60.

Figure 6:
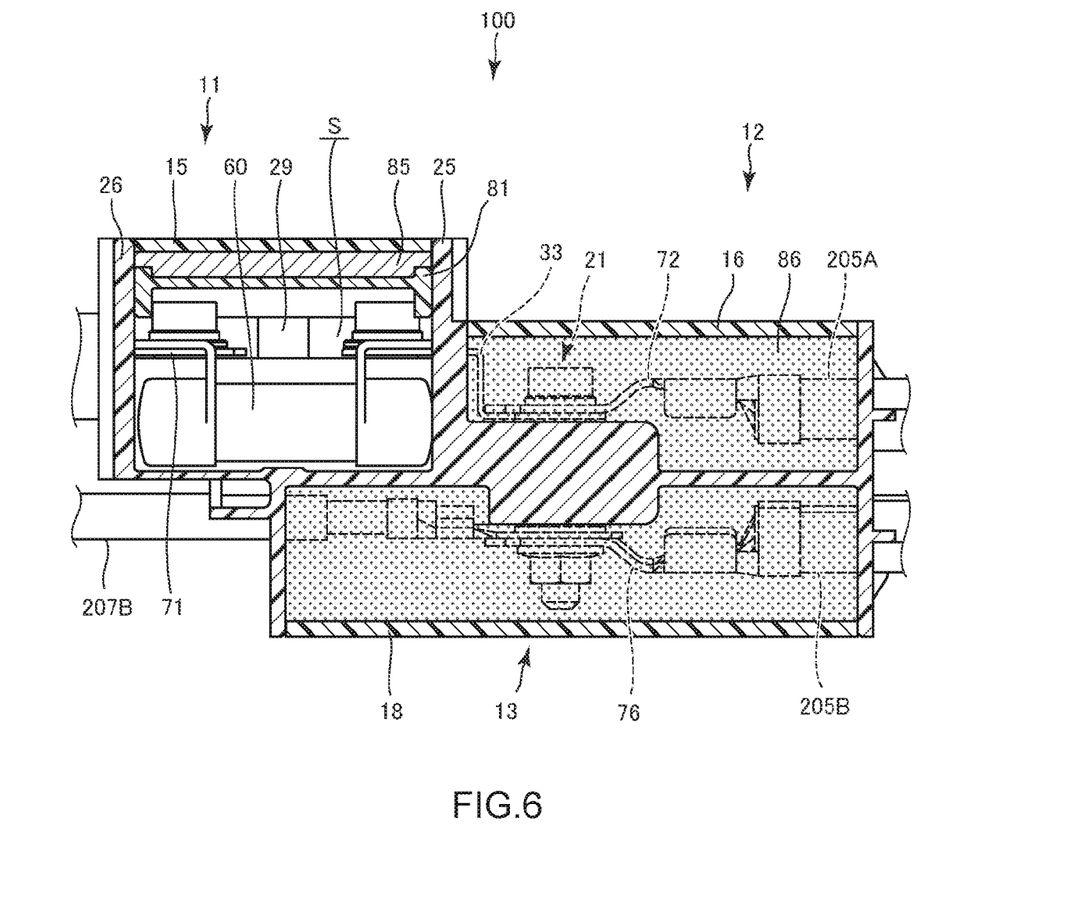
FIG. 6 is an explanatory view for explaining a condition where a first housing portion and a second housing portion are sealed in the B-B cross-sectional view of the branch box illustrated in FIG. 3.

As illustrated in FIG. 6, the first housing portion 11 has its opening closed by a lid portion 81 (more specifically, the lid portion 81, the cover 15 and a first sealing material 85 formed so as to fill the gap therebetween) to thereby define inside a space S for housing the fuse 60. The lid portion 81 is supported in such a manner as not to be too close to the fuse 60 (in other words, in such a manner as to secure the space S) by the rib 29 protruding from the inner wall of the first housing portion 11.

Further, the first sealing material 85 is poured (potted) to the outside (upper side) of the lid portion 81 to thereby fill the gap between the lid portion 81 and the opening. At this time, the first sealing material 85 is out of contact with the fuse 60. The first sealing material 85 is integrated with the partition walls 25 and 26 and the lid portion 81 by being hardened, thereby maintaining the first housing portion 11 in a tightly closed state. The first sealing material 85 is a soft one-component potting material, and has the property of being easily peeled off even after hardened. In other words, the first sealing material 85 is made from (or made of) a material with which unsealing is easier than with a second sealing material 86 described later. The cover 15 is attached to the first housing portion 11 after the first sealing material 85 is poured. The cover 15 may be attached before the first sealing material 85 is hardened or may be attached after it is hardened.

On the other hand, in the second housing portion 12, the second sealing material 86 is poured (potted) in the entire inside (the entire housing chamber) where the branch portion 21 and the like are housed. Because of this, the second sealing material 86 is in contact with all the members including the branch portion 21 in the second housing portion 12. The second sealing material 86 is a hard two-component potting material, and has the property of hardening firmly. For this reason, the second sealing material 86 is not easy to peel off after hardened. In addition, the cover 16 is attached to the second housing portion 12 after the second sealing material 86 is poured. The cover 16 may be attached before the second sealing material 86 is hardened or may be attached after it is hardened. Further, the second sealing material 86 is poured (potted) in the entire inside of the third housing portion 13 and the fourth housing portion 14 like the second housing portion 12, and the covers 16, 17 and 18 are attached.

When the second sealing material 86 is poured (potted) into the second housing portion 12 as described above, since the bus bar 33 is press-fitted in the partition wall 25, the second sealing material 86 never leaks into the first housing portion 11. Likewise, since the plate terminal 71 is press-fitted in the partition wall 26, when the second sealing material 86 is poured (potted) into the third housing portion 13, the second sealing material 86 never leaks into the first housing portion 11. As a result, not only the first sealing material 85 but also second sealing material 86 is out of contact with the fuse 60.

Figure 7:
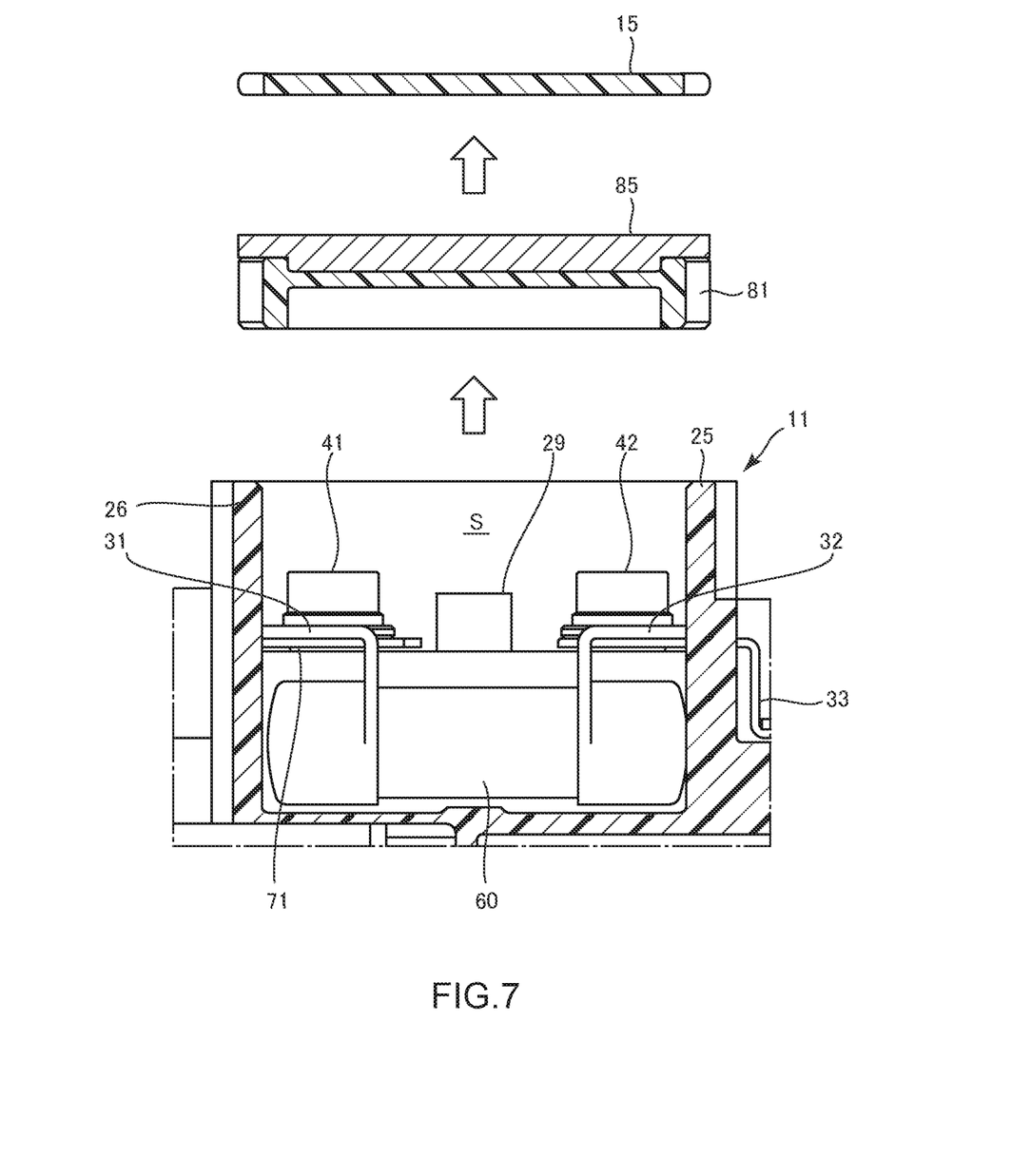
FIG. 7 is an explanatory view for explaining a way to replace a fuse in the B-B cross-sectional view of the branch box illustrated in FIG. 3.

As illustrated in FIG. 7, when the fuse 60 is replaced, the cover 15 is detached (peeled off) from the first housing portion 11 and further, the first sealing material 85 and the lid portion 81 are detached (peeled off). This brings the opening of the first housing portion 11 into opened state. Then, the nuts 41 and 42 fixing the bus bars 31 and 32 connecting with the fuse 60 are detached, and the fuse 60 and the bus bars 31 and 32 are taken out from the first housing portion 11 (the space S). Then, after a new fuse 60 is attached to the bus bars 31 and 32, the new fuse 60 is housed in the first housing portion 11 by following a procedure reverse to the above-described one. Further, in preparation for the resealing of the first housing portion 11, the first sealing material 85 is removed (peeled off) from the lid portion 81.

After the attachment of the new fuse 60 is completed, as described above, the lid portion 81 is attached to the opening of the first housing portion 11, the first sealing material 85 is poured (potted) again, and then, the cover 15 is attached. Thereby, the space S inside the first housing portion 11 is sealed again. With the above, the replacement of the fuse 60 is completed.

As described above, in the branch box 100, the fuse 60 is stored in the space S defined inside the first housing portion 11 (specifically, in the space S formed by closing the opening of the first housing portion 11 by the lid portion 81 and the first sealing material 85) and the sealing material (the first sealing material 85) is out of contact with the fuse 60. For this reason, at the time of replacement of the fuse 60, by separating (e.g., peeling off) the lid portion 81 and the first sealing material 85 from the opening of the first housing portion 11, the fuse 60 can be easily replaced. Further, after the replacement of the fuse 60, by attaching the lid portion 81 to the opening of the first housing portion 11 again (for example, by attaching the lid portion 81 to the opening again by use of the first sealing material 85 after peeling off the first sealing material 85 adhering to the lid portion 81), the fuse 60 can be easily sealed again. Hence, with the branch box 100, the replacement of the fuse 60 is easy compared with the background-art box.

Further, the first housing portion 11 and the second housing portion 12 are separated by the partition wall 25 and separately sealed by sealing materials independent of each other (the first sealing material 85 and the second sealing material 86). For this reason, the work of replacement of the fuse 60 (the work of separating the first sealing material 85 from the first housing portion 11) does not affect the sealed state of the second housing portion 12. Hence, the sealed state by resin sealing can be more surely retained than when the first housing portion 11 and the second housing portion 12 are sealed by sealing materials that are continuous (not independent of each other). In addition, since the fuse 60 in the first housing portion 11 and the branch portion 21 in the second housing portion 12 are connected by the bus bar 33 (conductive member) passing through the partition wall 25, the electric connection between the fuse 60 and the branch portion 21 is secured even though the first sealing material 85 and the second sealing material 86 are independent of each other.

Hence, regarding a branch box including a plurality of sealed objects such as the fuse 60 with resin, the branch box 100 is capable of achieving both of easy fuse replacement and resin-sealed state retainment.

Further, according to the branch box 100, when the first housing portion 11 is unsealed (when the lid portion 81 and the first sealing material 85 are separated from the opening of the first housing portion 11), the unsealing is easier than when both the first housing portion 11 and the second housing portion 12 are sealed by the second sealing material 86 (sealing material with which unsealing is more difficult). For this reason, the replacement of the fuse 60 is facilitated. Further, a strong sealing material not intended for unsealing can be adopted as the second sealing material 86. For this reason, the sealed state of the second housing portion 12 (the branch portion 21) can be more surely held.

Further, according to the branch box 100, since the second sealing material 86 is in contact with the branch portion 21, even when an external force and an impact reach the branch box 100, a position shift of the branch portion 21 can be prevented. In other words, the branch portion 21 is firmly held. For this reason, the sealed state of the second housing portion 12 (the branch portion 21) can be more surely held than when the second sealing material 86 is out of contact with the branch portion 21.

Further, according to the branch box 100, since the bus bar 33 is press-fitted in the partition wall 25, no gap is substantially present between the bus bar 33 and the partition wall 25. For this reason, when the first housing portion 11 and the second housing portion 12 are each sealed (potted), the leakage of the sealing material from one housing portion to the other housing portion can be more surely prevented than when the bus bar 33 is simply inserted in a through hole of the partition wall 25. In addition, it is unnecessary to provide a gasket for preventing such leakage. Consequently, the manufacturing cost of the branch box can be reduced as well as achieving both of easy fuse replacement and resin-sealed state retainment.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

For example, in the above-described embodiment, the second housing portion 12 and the fourth housing portion 14 are separated by the partition wall 27. However, for example, the second housing portion 12 and the fourth housing portion 14 may be a continuous housing portion. Further, the configuration of the insertion holes 25a and 26a is not limited the slit-like form and may be changed as appropriate according to the cross-sectional shape of the conductive member (the bus bar 33 and the plate terminal 71).

Here, features of the above-described embodiment of the branch portion according to the present invention are briefly summarized and listed briefly in the following items [1] to [4]:

[1]

A branch box (100) branching electric power supplied from a power source (201) to a plurality of objects (202, 204) to be supplied with the electric power, the branch box (100) comprising:

a branch portion (21) branching a power path (205A) connecting to the power source (201) into at least two branch paths (206A, 207A);

a fuse (60) located on at least one of the branch paths (206A, 207A);

a conductive member (33) connecting the branch portion (21) and the branch path (207A) having the fuse (60);

a first housing portion (11) receiving the fuse (60), the first housing portion (11) having a box shape with an opening on one surface, the opening being closed by a lid portion (81) to define a space for housing the fuse (60) inside the first housing portion (11); and a second housing portion (12) receiving the branch portion (21), the first housing portion (11) being sealed with a first sealing material (85) filling a gap between the lid portion (81) and the opening and being out of contact with the fuse (60), the second housing portion (12) being sealed with a second sealing material (86) independent from the first sealing material (85), and the conductive member (33) passing through a partition wall (25) separating the first housing portion (11) and the second housing portion (12).

[2]

The branch box (100) according to item [1], wherein the first sealing material (85) is made from a material to allow unsealing of the first sealing material (85) easier than unsealing of the second sealing material (86).

[3]

The branch box (100) according to item [1] or item [2], wherein the second sealing material (86) is in contact with the branch portion (21).

[4]

The branch box (100) according to any of item [1] to item [3], wherein the conductive member (33) is press-fitted in an insertion hole (25a) through the partition wall (25).

REFERENCE SIGNS LIST

10 Branch box body
11 First housing portion
12 Second housing portion
13 Third housing portion
20 Circuit structure
25 Partition wall
25a Insertion hole
26 Partition wall
26a Insertion hole
33 Bus bar (conductive member)
60 Fuse
71 Plate terminal (conductive member)
81 Lid portion
100 Branch box
201 Battery (power source)
202 Inverter (object to be supplied with power)
204 Air conditioner unit (object to be supplied with power)
205 Electric wire (power path)
206 Electric wire (power path, branch path)
207 Electric wire (power path, branch path)

The invention claimed is:

1. A branch box branching electric power supplied from a power source to a plurality of objects to be supplied with the electric power, the branch box comprising:

a branch portion branching a power path connecting to the power source into at least two branch paths;

a fuse located on at least one of the branch paths;

a conductive member connecting the branch portion and the branch path having the fuse;

a first housing portion receiving the fuse, the first housing portion having a box shape with an opening on one surface, the opening being closed by a lid portion to define a space for housing the fuse inside the first housing portion; and a second housing portion receiving the branch portion, the first housing portion being sealed with a first sealing material filling a gap between the lid portion and the opening and being out of contact with the fuse, the second housing portion being sealed with a second sealing material independent from the first sealing material, and the conductive member passing through a partition wall separating the first housing portion and the second housing portion.

2. The branch box according to claim 1, wherein the first sealing material is made from a material to allow unsealing of the first sealing material easier than unsealing of the second sealing material.

3. The branch box according to claim 1, wherein the second sealing material is in contact with the branch portion.

4. The branch box according to claim 1, wherein the conductive member is press-fitted in an insertion hole through the partition wall.

* * * * *